US007275470B2

(12) United States Patent
Bettacchini

(10) Patent No.: US 7,275,470 B2
(45) Date of Patent: Oct. 2, 2007

(54) MITER SAW

(75) Inventor: Marcello Bettacchini, Perugia (IT)

(73) Assignee: Black & Decker Inc., Newark, DE (US)

( * ) Notice: Subject to any disclaimer, the term of this patent is extended or adjusted under 35 U.S.C. 154(b) by 238 days.

(21) Appl. No.: 11/070,599

(22) Filed: Mar. 2, 2005

(65) Prior Publication Data

US 2005/0229761 A1 Oct. 20, 2005

(30) Foreign Application Priority Data

Mar. 2, 2004 (GB) ................................ 0404628.0

(51) Int. Cl.
*B27B 5/36* (2006.01)
*B23D 19/00* (2006.01)

(52) U.S. Cl. ...................... 83/490; 83/471.2; 83/471.3; 83/473; 83/477.1; 83/581

(58) Field of Classification Search .................. 83/490, 83/471.3, 564, 486.3, 699, 473, 581, 468.7, 83/469, 477.1, 767, 698.51, 98, 373, 371.3, 83/165, 100, 108, 471, 471.2, 397, 522.15, 83/698.11, 486.1, 676, 486.11, 698.3, 488, 83/698.14, 483; 144/1, 287; 451/456, 453; 30/519
See application file for complete search history.

(56) References Cited

U.S. PATENT DOCUMENTS 4,011,782 A * 3/1977 Clark et al. ................ 83/471.3
5,249,496 A * 10/1993 Hirsch et al. .............. 83/471.3
5,347,902 A * 9/1994 Brickner et al. ........... 83/468.3
5,421,228 A 6/1995 Fukinuki
5,425,294 A 6/1995 Ushiwata et al.
5,623,860 A 4/1997 Schoene et al.
5,839,339 A 11/1998 Sasaki et al.
5,862,732 A * 1/1999 Itzov ......................... 83/471.3
5,870,939 A * 2/1999 Matsubara ................. 83/471.3
6,474,206 B1 * 11/2002 Brunson .................... 83/471.3
6,532,853 B1 3/2003 Kakimoto et al.

(Continued)

FOREIGN PATENT DOCUMENTS

DE 298 14 706 U1 12/1998

(Continued)

OTHER PUBLICATIONS

M. Rijks, European Search Report, Jun. 15, 2005, The Hague.

(Continued)

*Primary Examiner*—Boyer D. Ashley
*Assistant Examiner*—Ghassem Alie
(74) *Attorney, Agent, or Firm*—Adan Ayala

(57) ABSTRACT

A miter saw includes a base, a table rotatably mounted on the base, and a extension arm rigidly connected to the periphery of the table and extending radially away from the axis of rotation of the table. The angular position of the table relative to the base may be fixed via a locking member mounted on the extension arm. The locking member can be linearly moved relative to the extension arm between a locked position where the angular position of the table is fixed relative to the base, and an unlocked position. The locking member is also pivotable between a locked position where the angular position of the table is fixed relative to the base, and an unlocked position.

12 Claims, 9 Drawing Sheets

U.S. PATENT DOCUMENTS

| | | | | |
|---|---|---|---|---|
| 6,595,095 | B2 * | 7/2003 | Chen | 83/473 |
| 6,658,977 | B2 | 12/2003 | Chang | |
| 6,779,428 | B2 * | 8/2004 | Kao | 83/469 |
| 6,810,780 | B2 * | 11/2004 | Ceroll et al. | 83/471.3 |
| 7,013,780 | B2 * | 3/2006 | Brunson | 83/471.3 |
| 2003/0024365 | A1 * | 2/2003 | Chang | 83/471.3 |
| 2003/0037656 | A1 | 2/2003 | Brunson | |
| 2004/0060412 | A1 | 4/2004 | Kao | |
| 2004/0154448 | A1 * | 8/2004 | Romo et al. | 83/471.3 |

FOREIGN PATENT DOCUMENTS

| | | | |
|---|---|---|---|
| DE | 20313885 | U1 | 11/2003 |
| EP | 0 407 204 | A2 | 1/1991 |
| EP | 0 622 145 | A1 | 11/1994 |
| EP | 1038622 | A2 | 9/2000 |
| EP | 1 231 007 | A2 | 8/2002 |
| EP | 1 256 407 | A | 11/2002 |
| EP | 1256407 | A1 | 11/2002 |
| EP | 1 287 954 | A1 | 3/2003 |
| GB | 2269561 | A | 2/1994 |

OTHER PUBLICATIONS

Annex to the European Search Report on European Patent Application No. EP 05 00 1985.

D. Chariot, Partial European Search Report, Jul. 6, 2005, The Hague.

Annex to the European Search Report on European Patent Application No. EP 05 00 9549.

Mark Rijks, European Search Report, Feb. 23, 2007, The Hague.

Annex to the European Search Report on European Patent Application No. EP 07 10 1638.

* cited by examiner

MITER SAW

The present application derives priority from UK Patent Application No. GB 0404628.0, filed on Mar. 2, 2004.

FIELD OF THE INVENTION

The present invention relates to a saw, and in particular, to a saw which is capable of making miter cuts and/or chop cuts and/or bevel cuts.

BACKGROUND OF THE INVENTION

A sliding compound miter saw includes a base made from cast metal, a flat circular table rotatably mounted within the base about a vertical axis, an extension arm which is rigidly attached to the side of the circular table and extends radially outwardly from the axis of rotation of the table, a mount pivotably mounted onto the rear of the round table in such manner that it can pivot about a horizontal axis which axis intersects the vertical axis of rotation of the round table, a saw support structure pivotally connected to the mount and capable of being pivoted about a horizontal axis, perpendicular to the horizontal axis of pivot of the mount, through a limited range of angular movement in a vertical plane, and a saw unit slidably attached to the saw support structure which is capable of sliding towards or away from the saw support structure across the round table and extension arm. A groove is formed extends from the center of the round table radially outwardly across the table and then along the length of the arm into which the saw blade can be plunged. EP0242733 describes an existing design of such a saw in detail.

SUMMARY OF THE INVENTION

An improved saw according to the invention may include a base, a round table rotatably mounted on the base, an extension arm rigidly connected to the periphery of the round table and which extends radially away from the axis of rotation of the round table, a saw unit mounted on the round table for cutting work pieces located on the round table or extension arm, a locking mechanism for angularly locking the position of the round table relative to the base to prevent rotation of the table relative to the base, wherein the locking mechanism has a locking member mounted on the extension arm that can be linearly slid in relation to the extension arm from a first position where a first engaging part of the locking mechanism is disengaged from the base to a second position where it engages a part of the base in order to prevent relative movement between the extension arm and the base, or vice versa; and be pivoted in relation to the extension arm from a first position where a second engaging part of the locking mechanism is disengaged from the base to a second position where it engages a part of the base to prevent relative movement between the extension arm and the base, or vice versa.

According to a second aspect of the present invention, a saw may include a base, a table mounted on the base, a mount pivotally mounted onto the table, a saw unit connected to the mount for cutting work piece located on the table, and a locking mechanism for angularly locking the position of the mount relative to the table, where the locking mechanism may comprise an arcuate slot formed through the mount, a locking device attached to the table which extends through the arcuate slot which is capable of locking the angular position of the mount relative to the table when it is locked and is capable of sliding along the length of the arcuate slot when it is released allowing the mount to be pivoted relative to the table, and an angle limit mechanism moveable between a first position where the amount of angular movement of the mount relative to the table is a first predetermined amount, and a second position where the amount of angular movement of the mount relative to the table is a second predetermined amount, when the locking device is released.

According to a third aspect of the present invention, an angle limit mechanism for a saw may include a base, a table mounted on the base, a mount pivotally mounted onto the table, a saw unit connected to the mount for cutting work piece located on the table, and a locking mechanism for angularly locking the position of the mount relative to the table, the locking mechanism preferably comprising an arcuate slot formed through the mount, a locking device attached to the table which extends through the arcuate slot which is capable of locking the angular position of the mount relative to the table when it is locked and is capable of sliding along the length of the arcuate slot when it is released allowing the mount to be pivoted relative to the table, the angle limit mechanism preferably comprising a tube having at one end, part of the wall of the tube removed and a bar extending perpendicular to the longitudinal axis of the tube attached to the other end wherein a peg is attached to the bar and projects in a direction which is parallel to the tube.

BRIEF DESCRIPTION OF THE DRAWINGS

An embodiment of each of inventions will now be described with reference to the accompanying drawings of which.

DETAILED DESCRIPTION

Figure 1:
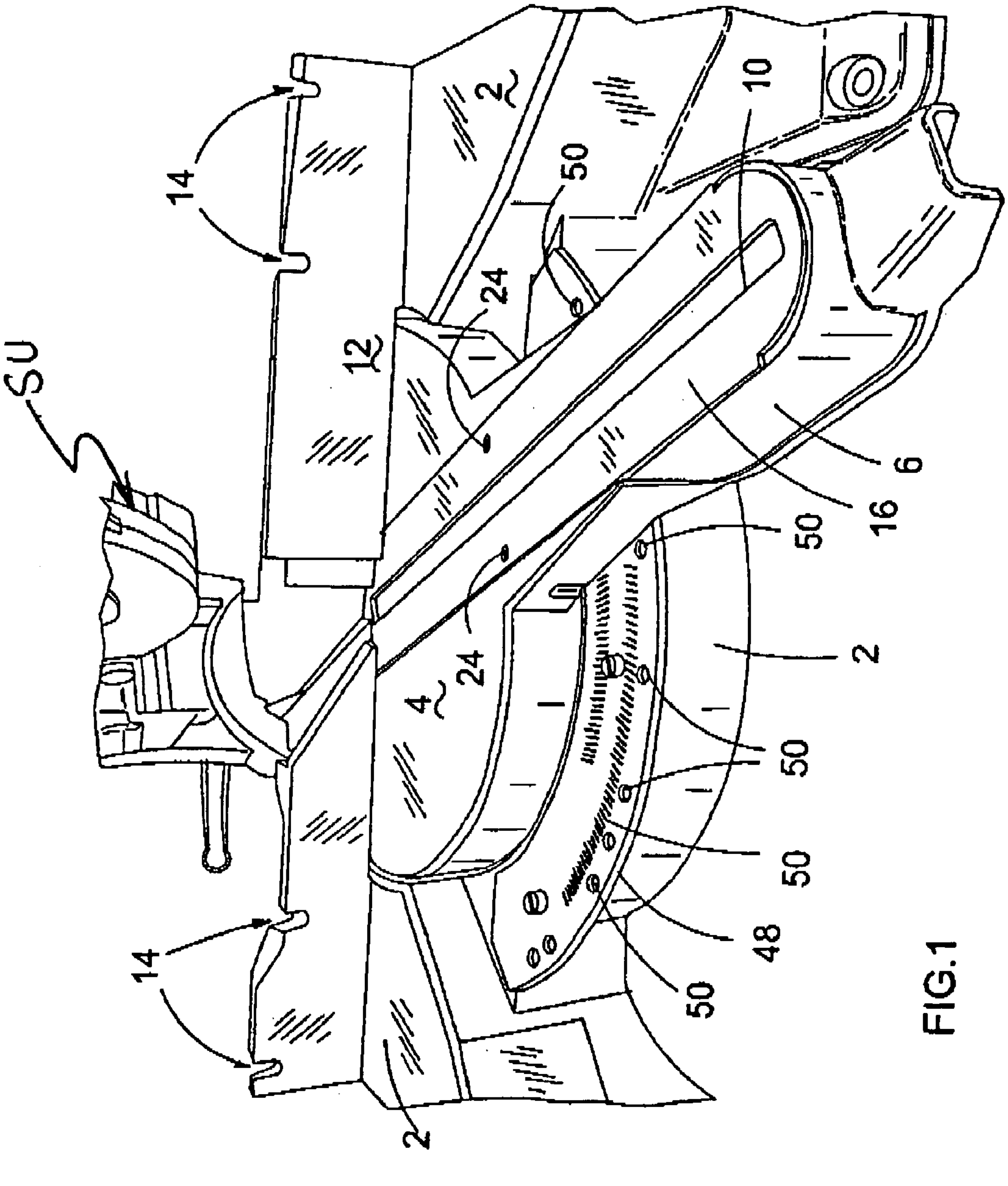
FIG. 1 shows a front view of a miter saw according to the present invention.

A sliding compound miter saw may comprise a base 2 made from cast metal, a flat circular table 4 rotatably mounted within the base 2 about a vertical axis, an extension arm 6 which attaches to the side of the circular table 4 and extends radially outwardly from the axis of rotation of the table 4, a mount 8 pivotably mounted onto the rear of the round table 4 in such manner that it can pivot about a horizontal axis which intersects the vertical axis of rotation of the round table 4, a saw support structure (not shown) pivotally connected to the mount and capable of pivoting about a horizontal axis, perpendicular to the horizontal axis of pivot of the mount 8 through a limited range of angular movement in a vertical plane, and a saw unit SU slidably attached to the saw support structure which is capable of sliding towards or away from the saw support structure across the round table. An elongated slot 10 is preferably formed to extend from the center of the round table 4 radially outwardly across the table and then along the length of the arm 6 into which the saw blade can be plunged.

A fence 12 may be disposed across the round table 4. Fence 12 may have a series of notches 14 in to be used in assisting clamping a workpiece.

Figure 2:
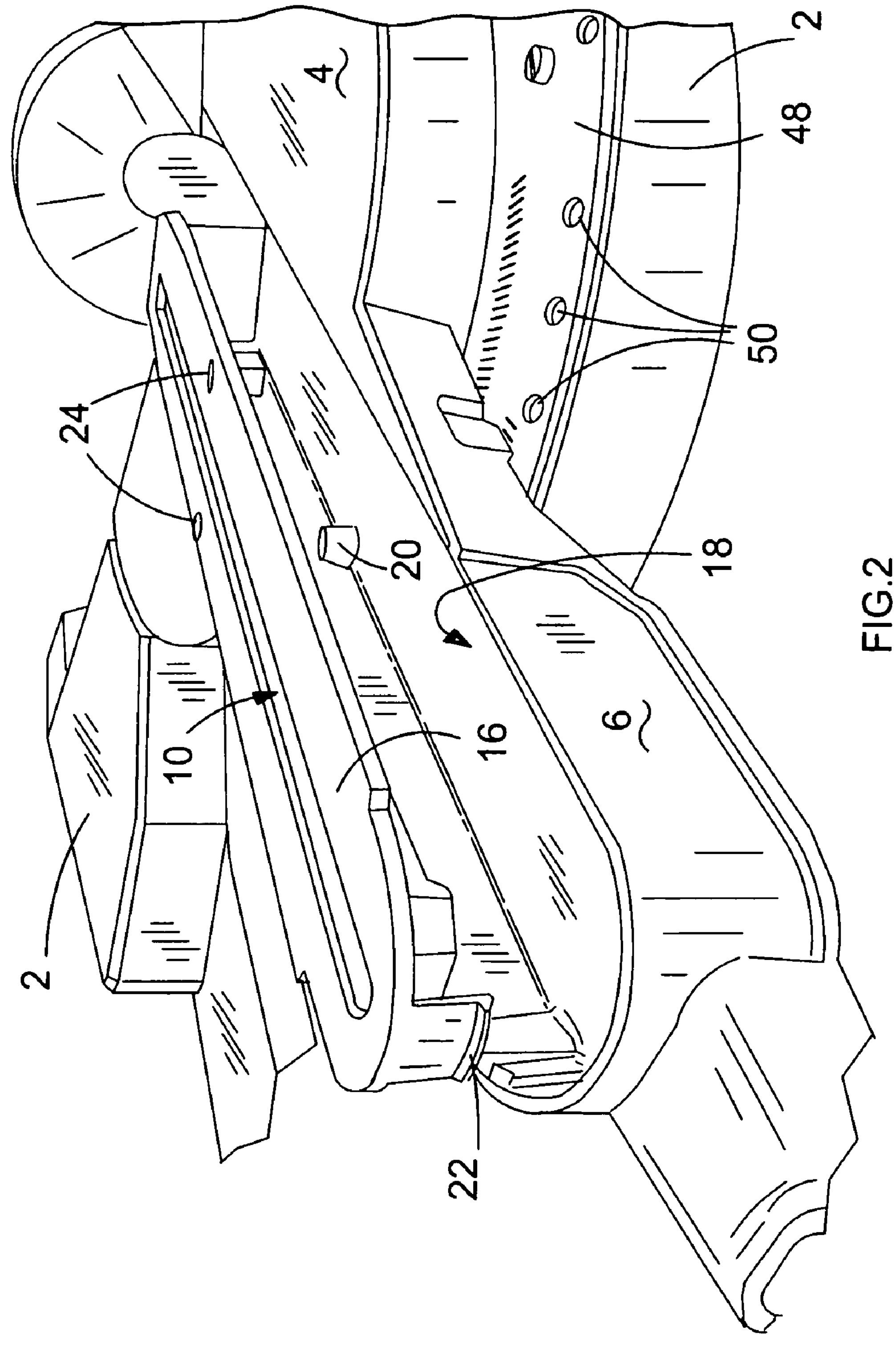
FIG. 2 shows a side perspective view of the extension arm with the plastic insert removed.
Figure 3:
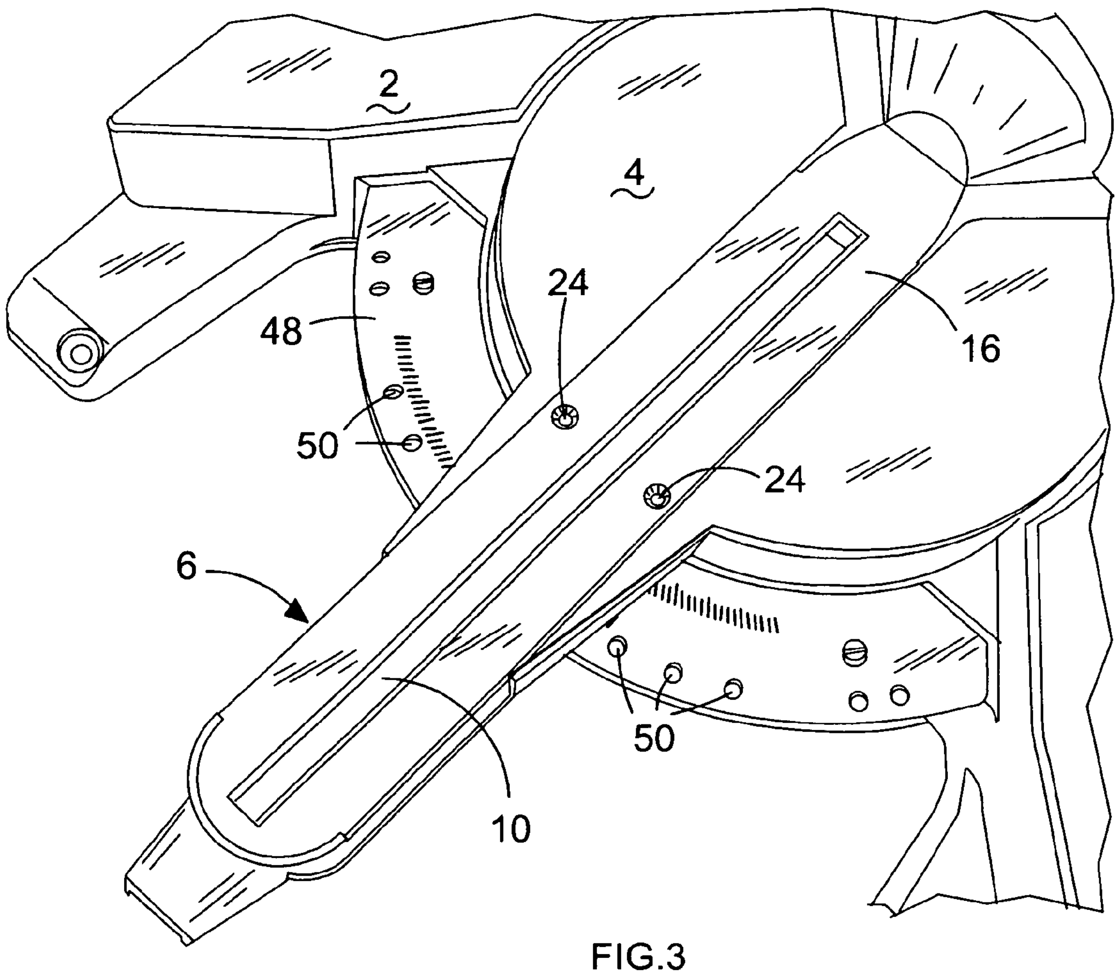
FIG. 3 shows a top view of the extension arm and round table.

Referring to FIGS. 1, 2 and 3, the elongated slot 10 is preferably formed by a plastic insert 16 which may clip into the arm 6 and/or round table 4 of the saw. The round table 4 and extension arm 6 may be made as a single integral unit from cast metal. A trough 18 may be formed within the unit from the center of and extending radially outwardly across the round table 4 and along the arm 6. Two bosses 20 may be formed in the center of the trough 18 on either side in symmetrical fashion. Bosses 20 may comprise threaded holes which are capable of receiving screws. Formed at either end of the trough 18 may be holes (not shown) which are capable receiving a clip 22 integrally moulded onto the ends of the plastic insert 16.

The plastic insert 16 preferably comprises an elongate sheet of plastic having straight sides and rounded ends having the same outline shape as the entrance to the trough 18 and may comprise an elongated slot 10 formed along the majority of the length of the insert 16. Two holes 24 may be formed through the insert 16 centrally lengthwise which preferably align with the two holes formed in the two bosses 20 when the plastic insert 16 is inserted into the trough 18. Plastic clips 22 may be integrally formed on the plastic insert 16 at both ends of it.

In order to attach the plastic insert 16 into the trough 18, the two clips 22 are preferably engaged with the holes formed at the ends of the trough 18, where the two holes 24 in the plastic insert may align with the two holes of the two bosses 20. Two screws may be then passed through the two holes and screwed into the bosses 20 to secure plastic insert 16 into the trough 18.

The angular position of the round table 4 and extension arm 6 can be locked in relation to the base. The locking mechanism will now be described with reference to the FIGS. 4, 5, 6, 7, 8 and 9.

The locking mechanism preferably comprises a knob 26 rigidly attached to one end of a metal rod 28. A rubber stop 30 may be mounted on the other end of the metal rod 28. The construction of rubber stop 30 will be described in more detail below. Preferably, a portion 32 of the length of the metal rod 30 is threaded. The threaded portion 32 of the rod 30 is preferably threaded through a metal block 34. Rotation of the metal rod 30 about its longitudinal axis 36 results in the metal rod sliding left and right as indicated by Arrow A in FIG. 4.

The metal block 34 preferably has two metal pins 38 of circular cross-section projecting from each side of the metal block 34 in opposite directions, perpendicularly to the longitudinal axis 36 of the metal rod 28. The two pins 38 may form a pivot axle for the metal block 34, the metal block 34 being capable of pivoting about a horizontal axis. The metal block 34 together with the pins 38 are preferably mounted on the underside of the extension arm 6, the two metal pins 38 being located horizontally within slots (not shown) on the underside of the extension arm 6 and arranged in such manner that the metal block 34 can pivot about the axis of the pins 38. The direction of movement caused by the pivoting of a block is indicated by Arrow B in FIG. 4. As the block 34 pivots, so the metal rod 28, knob 26 and rubber stop 30 also pivot about the pins 38.

The knob 26 preferably extends from the end of the extension arm 6 away from the round table 4.

A spring 40 may be mounted on the underside of the extension arm 6 and is preferably located between the underside 42 of the extension arm 6 and the metal rod 28. The spring 40 may exert a downward biasing force in the direction of Arrow C in FIG. 4 onto the metal rod 28 urging the end of the metal rod containing the knob 26 downwardly.

An extension piece 44 may be integrally formed with the metal block 34. A conical shaped pin 46 is preferably formed on the top of the extension piece 44. Accordingly, the biasing force of the spring 40 may bias the conical pin 46 upwardly.

Figure 4:
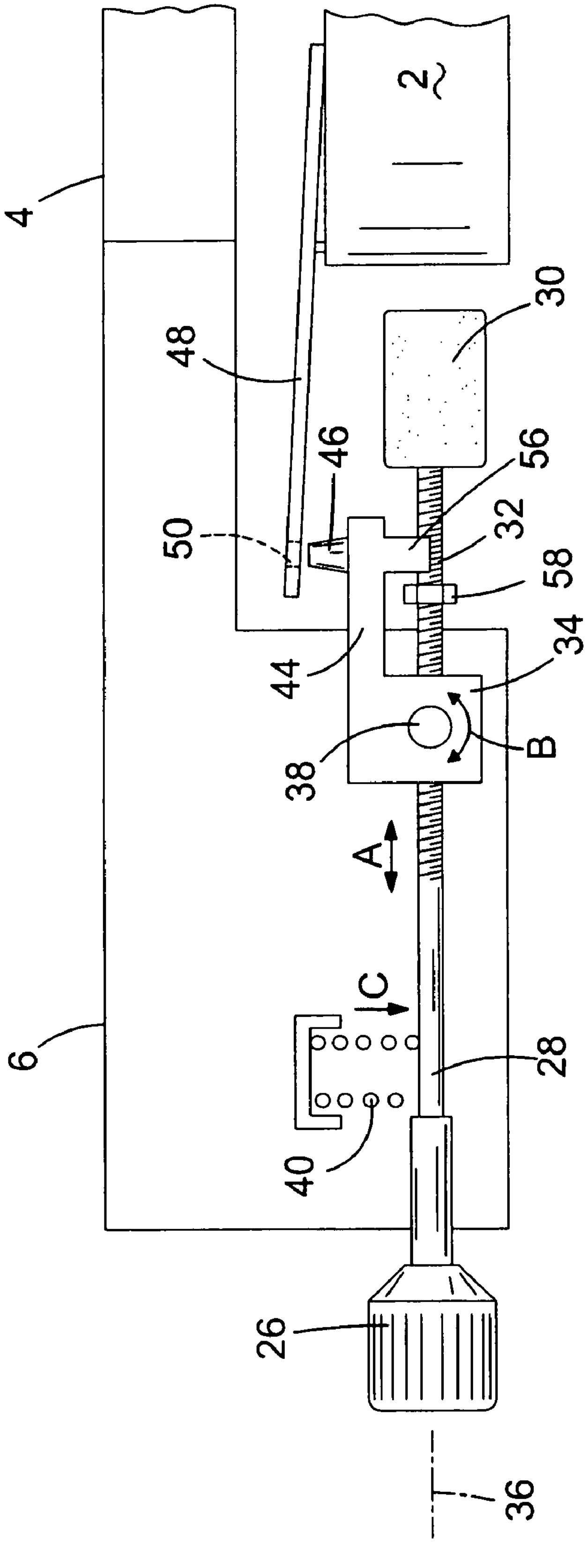
FIG. 4 shows a sketch of a side view of the locking mechanism of the round table.

A metal scale 48 may be attached rigidly to the base 2 of the saw as shown in FIGS. 1,2 and 3. The scale 48 may be used by an operator to show the miter angle which would be cut when the extension arm 6 is located at that angular position. A series of oval holes 50 may be formed through the metal scale 48 at predetermined angles of cut. As the extension arm 6 and round table 4 are pivoted about their vertical axis, the extension piece 44 together with the conical pin 46 may move underneath the scale 48 as shown in FIG. 4. The series of holes 50 are preferably located along the path which is traveled by the conical pin 46 as it is moved under the scale 48. When the conical pin 46 is aligned with one of the series of holes 50, the biasing force of the spring 40 preferably urges the conical pin 46 into the hole 50 and locks the position of the extension arm 6 in relation to the scale 48. Because the pin 46 is preferably conical, it provides an easy engagement with the hole 50 even when the pin 46 and hole 50 are not completely aligned.

In order for a user to release the pin 46 from a hole 50, the user preferably exerts an upward force onto the knob 26 causing the knob 26 to move upwardly relative to the extension arm 6, pivoting the metal block 34 about the pins 38 and causing the conical pin 46 to be moved downwardly, withdrawing it from the hole 50. The extension arm 6 and round table 4 can then the rotated about their vertical axis.

The rubber stop 30 may face the base 2. Rotation of the metal rod 28 about its longitudinal axis 36 using the knob 26 can cause the rubber stop 30 to move towards the base 2 or away from the base 2. Rotation of the knob 26 sufficiently will cause the rubber stop 30 to frictionally engage with the outer surface of the base 2. When the rubber stop 30 is engaged with the surface of the base 2, the extension arm 6 and round table 4 are preferably prevented from rotation about their vertical axis. In order to allow the extension arm 6 and round table 4 to rotate, the knob 26 must be rotated to withdraw the rubber stop 30 away from the surface of the base 2, thus releasing the arm 6 and allowed to rotate.

The use of such a rubber stop 30 enables the extension arm and round table 4 to be locked at any angular position in relation to the base 2. This is unlike the pin 46 which only allows the extension arm and round table to be fixed in relation to the base 2 at predetermined positions as determined by the positions of holes 50 within the scale 48 fixed to the base 2.

Figure 5:
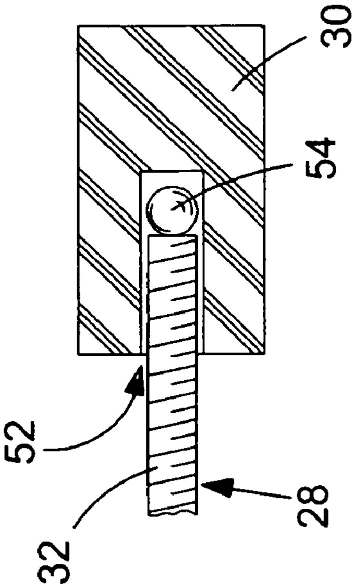
FIG. 5 shows a sketch of a vertical cross section of the rubber stop.
Figure 6:
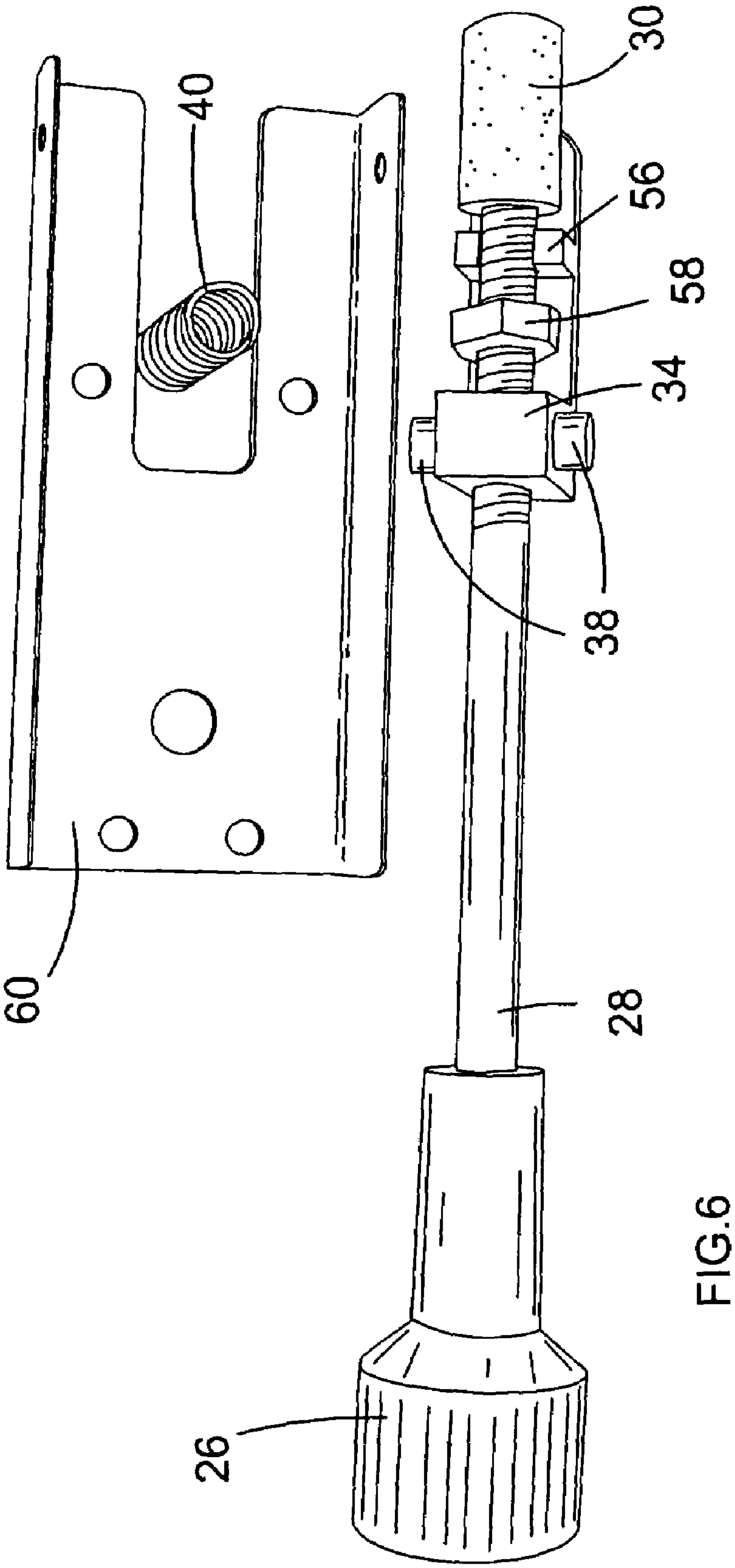
FIG. 6 shows the component parts of the locking mechanism.
Figure 7:
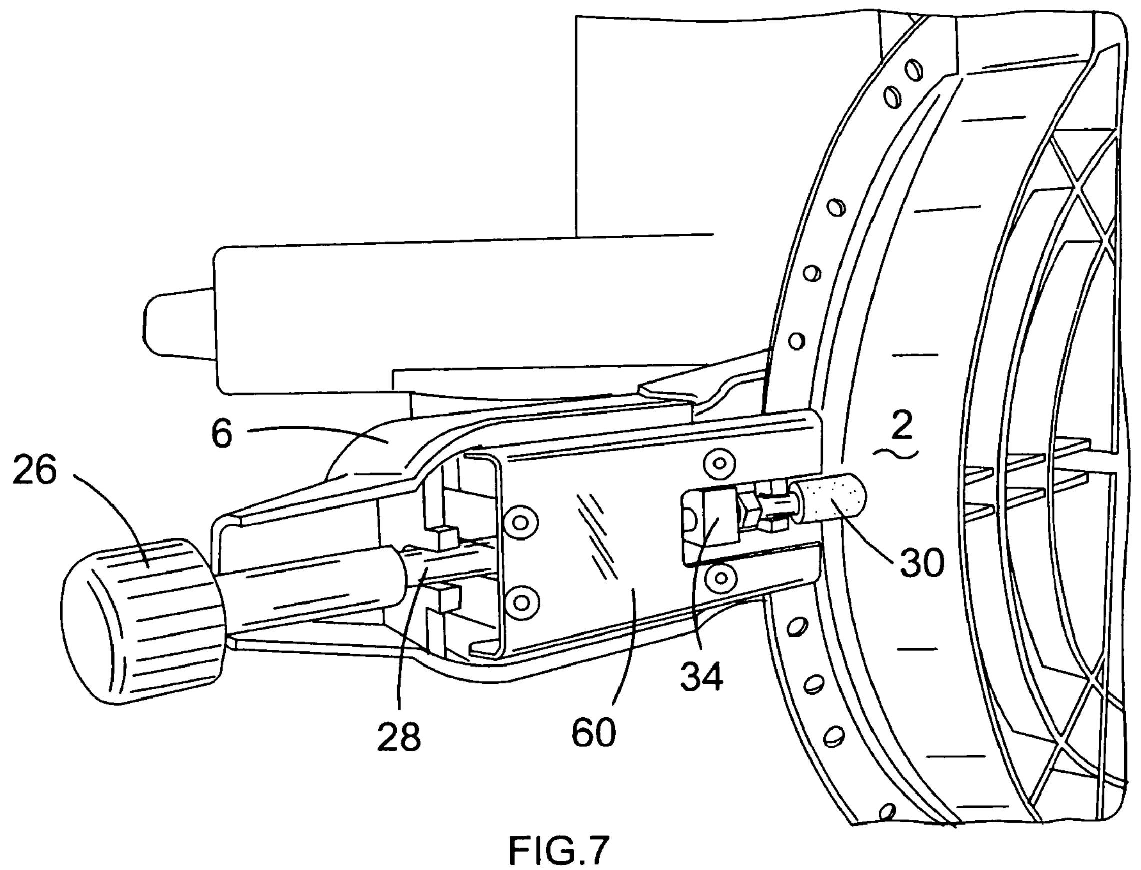
FIG. 7 shows an under view of the extension arm.

The construction of the rubber stop will now be described with reference to FIG. 5. FIG. 5 shows a vertical cross section of the rubber stop 30 as mounted on the metal rod 28. The end of the metal rod 28 may be inserted into an elongated passageway 52 formed within the rubber stop 30. A metal ball bearing 54 may be located at the end of the metal rod 28. The metal ball bearing 54 preferably allows the rod 28 to rotate whilst allowing the rubber stop 30 to remain stationary. The rubber stop 30 preferably has to remain stationary when it engages with the surface of the base 2 as the friction will prevent it from rotating. If no mechanism is provided to allow the rod 28 to rotate inside of the rubber stop 30, the rod 28 could damage the inside of the rubber stop 30. Furthermore, as pressure is exerted onto the rubber stop 30 by a rotation of the rod 28 about its longitudinal axis 36 which causes the rod 28 to move towards the base 2, the spherical shape of the ball bearing 54 preferably applies a force in a more distributed fashion to the rubber stop 30 than the sharp edges of the end of the rod 28 would, and thus prevents damage.

Though the holes 50 shown in the Figures are oval, it will be clear to a person that they could be any shape, e.g., square, round, slots, etc., including open ended slots or indents formed from the edge of the scale 48.

A metal stop 56 may be formed on the underside of the extension piece 44 is. A nut 58 is preferably threaded onto the threaded portion 32 of the metal rod 28 between the metal block 34 and the metal stop 56. The nut 58 may restrict the amount of travel of the metal rod 28 through the metal block 34, as the nut cannot pass the metal stop 56 in one direction or the metal block 34 in the other direction.

A cover plate 60 may be used to enclose the locking mechanism which is attached to the underside of the extension arm 6.

Figure 8:
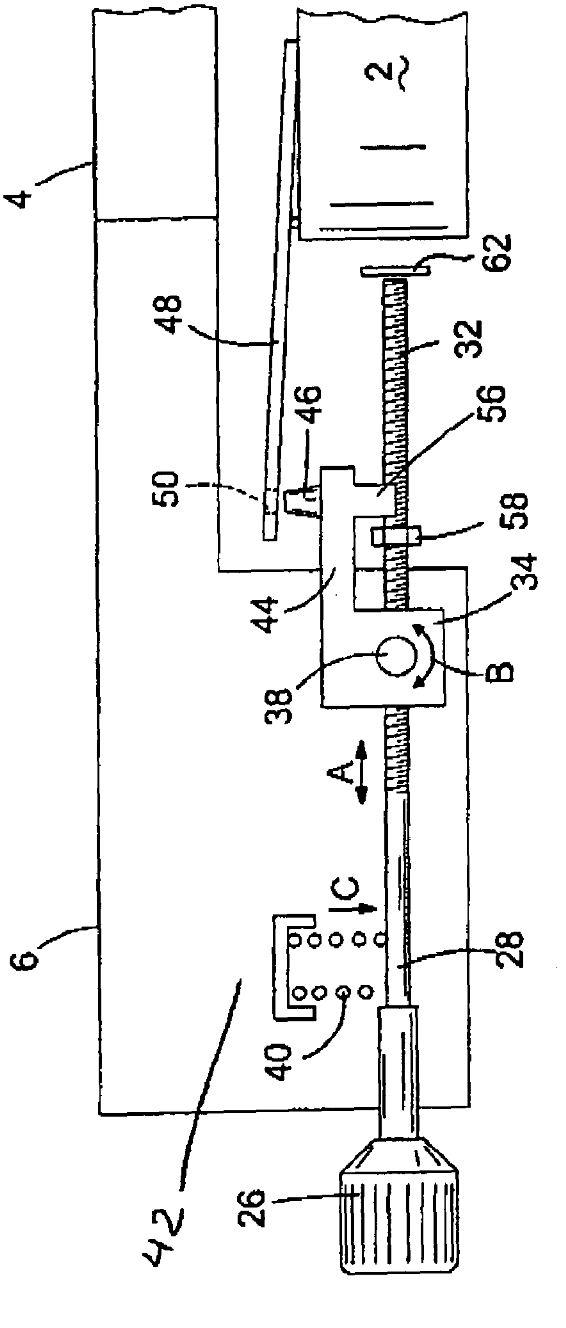
FIGS. 8 and 9 show an alternative embodiment of the locking mechanism.
Figure 9:
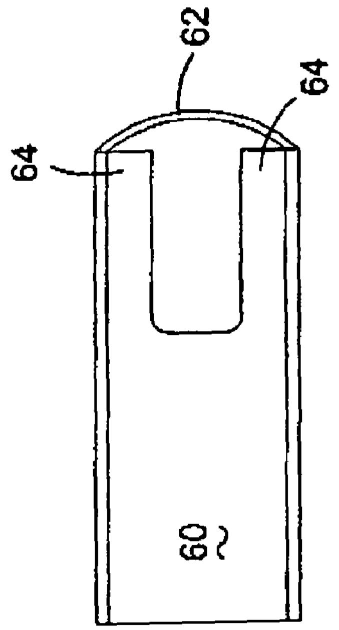

An alternative design to the rubber stop may be used which is shown in FIGS. 8 and 9. Where the same features are present, the same reference numbers have been used. Instead of the rubber stop, the end of the metal rod 28 may engage with a curved leaf spring 62 which is connected to the two ends 64 of cover plate 60 as shown in FIGS. 8 and 9. The curved leaf spring 62 preferably engages with the base 2 of the saw, the leaf spring 62 being sandwiched between the end of the elongate rod 28 and the base 2.

The mount 8 may be pivotably mounted onto the rear of the round table 4 in such manner that it can pivot about a horizontal axis which intersects the vertical axis of rotation of the round table 4. The angular position of the mount 8 can be fixed in relation to the round table 4 by a mount locking mechanism which will now be described with reference to FIGS. 10, 11 and 12.

The mount 8 preferably comprises a circular cast 70 which is located adjacent to and abuts against a similar circular cast 72 formed on the round table 4. The two circular casts 70,72 may be connected together by a retaining bolt 74 and nut 76 which pass through the centers of the two circular casts 70,72. The circular cast 70 of the mount 8 is able to pivot around the retaining bolt 74, allowing the mount 8 to pivot in relation to the round table 4.

An arcuate slot 78 may be formed through the circular cast 70 on the mount 8. A threaded rod (not shown) may be rigidly attached to the circular cast 72 of the round table 4 and may project through the arcuate slot 78. The threaded rod is preferably parallel to the retaining bolt 74.

Figure 11:
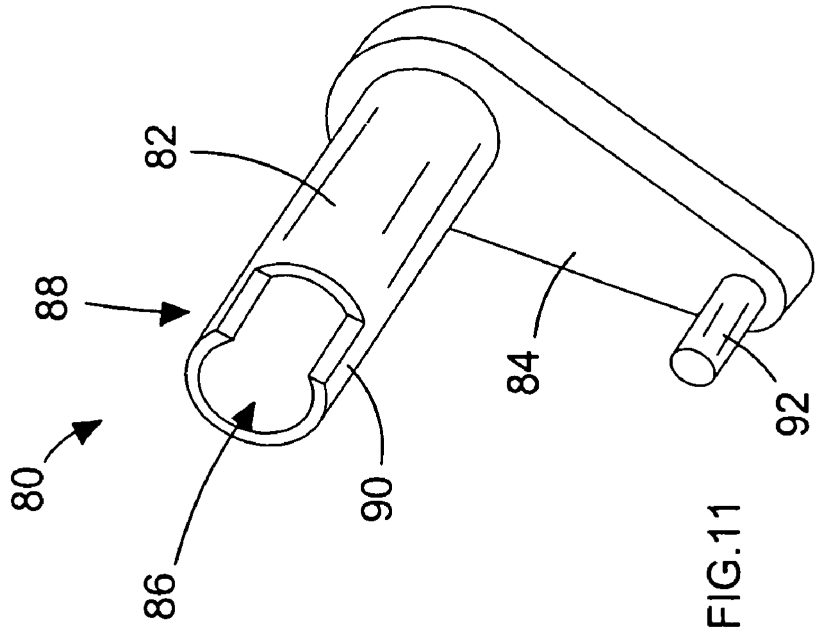
FIG. 11 shows a sketch at angle limit mechanism.

An angle limit mechanism 80 may be mounted on the threaded rod. FIG. 11 shows a drawing of the angle limit mechanism.

The angle limit mechanism 80 may comprise a metal tube 82 of circular cross section having at one end a teardrop shaped metal plate 84 attached as shown in FIG. 11. The passageway 86 through the metal tube 82 preferably extends through the teardrop shaped metal plate 84. Preferably, part 88 of a side wall 90 around approximately half the circumference of the metal tube 82 has been removed at the other end. A metal peg 92 is preferably mounted on the teardrop shaped plate 84, extending from the plate 84 in the same direction to the tube.

Figure 10:
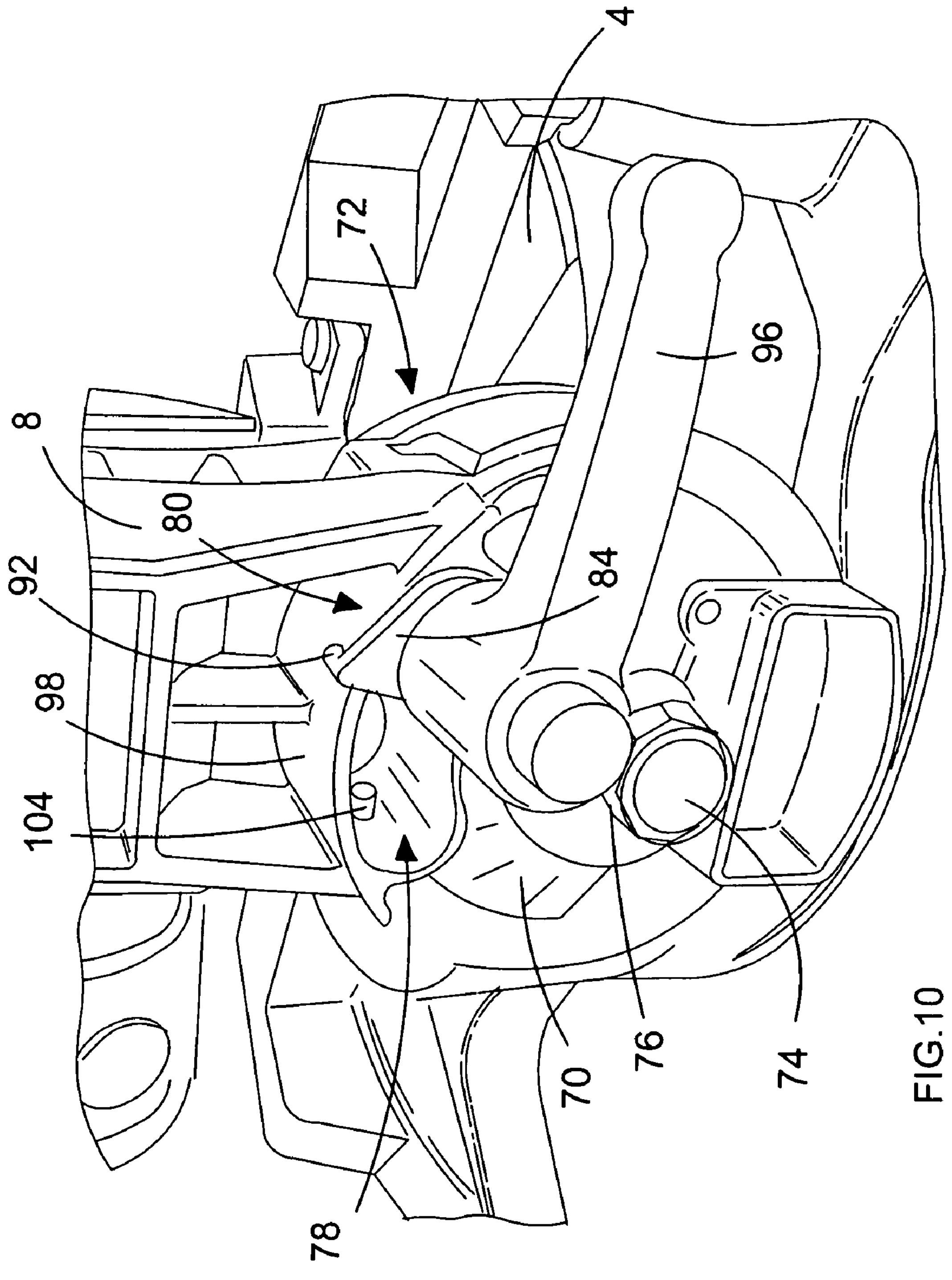
FIG. 10 shows a rear view of the mount locking mechanism.

The angle limit mechanism 80 may be mounted onto the threaded rod in such a manner that the metal tube 82 preferably extends into the arcuate slot 78 with the threaded rod located within the tube 82 while the teardrop shaped plate 84 preferably abuts against the entrance of the arcuate slot 78. The angle limit mechanism 80 can freely rotate about the threaded rod. The metal peg 92 then extends above the circular cast of the mount as shown in FIG. 10.

A nut (not shown) is preferably screwed onto the threaded rod which can sandwich the teardrop plate 84 of the angle limit mechanism 80 between the nut and the entrance 94 of the arcuate slot 78. A handle 96 surrounds the nut and is used by the operator to rotate the nut.

In order to adjust the angle of mount 8, an operator would unscrew the nut using the handle 96, slackening the angle limit mechanism. The circular cast 70 and hence the mount 8 is able to be pivoted relative to the round table 4. The user then tightens the nut sandwiching the rear drop shaped plate 84 of the angle limit mechanism 80 against the entrance 94 of the arcuate slot 78 in order to frictionally engage it to prevent the circular cast 70 from rotating. The circular cast 70 can be pivoted over a range of angles which is determined by the accurate slot and the position of the threaded rod within it.

Figure 12:
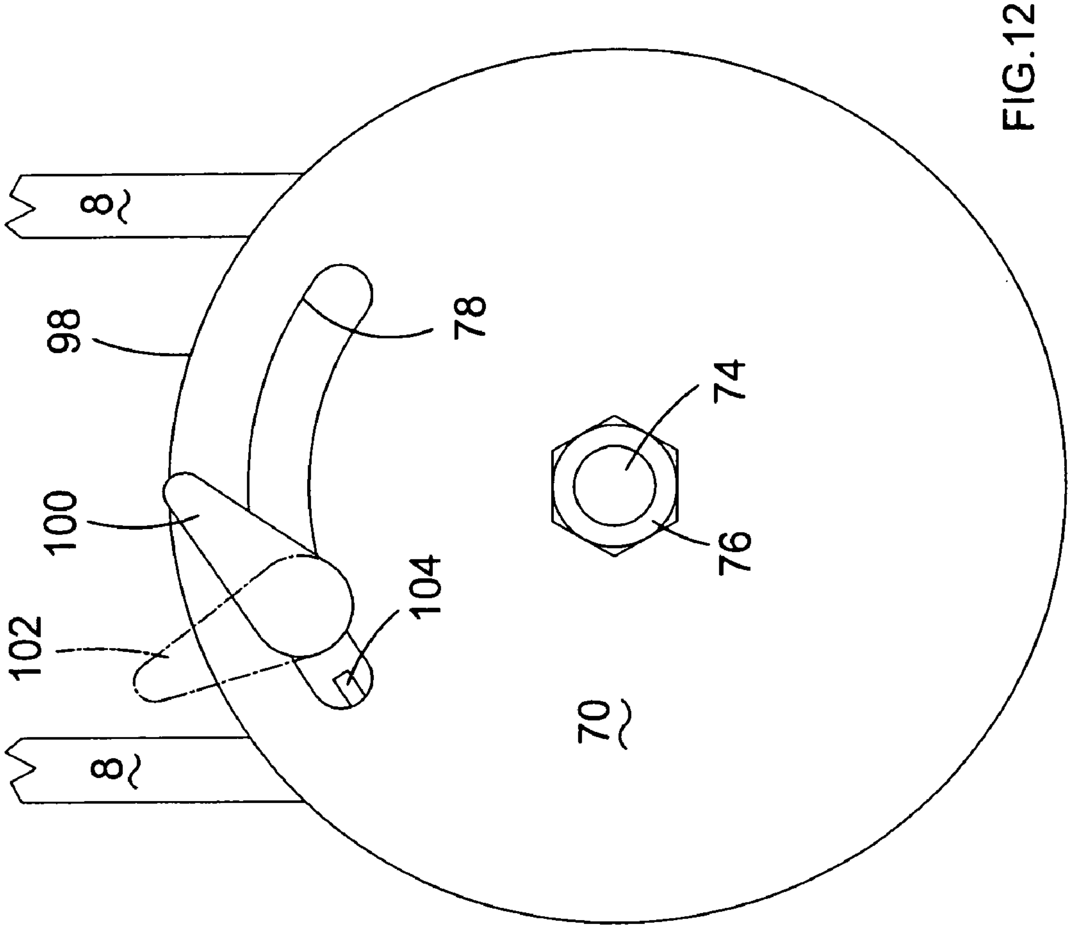
FIG. 12 shows a sketch of the two positions of the angle limit mechanism.

The angle limit mechanism 80 preferably enables the user to adjust the pivot angle to either 45 or 48 degrees. When the nut has been slackened, the angle limit mechanism 80 can freely rotate about the threaded rod. It can be pivoted such that the pin lies against the edge 98 of the top surface of the metal cast in the first direction (as shown in FIG. 12 by reference number 100) or in the other direction (as shown in FIG. 12 by reference number 102) so that it lies against the edge 98 of the metal cast.

Metal pin 104 is preferably located within one end of the arcuate slot 78. As the circular cast 70 rotates, so does the pin 104 within the arcuate slot 78. When the angle limit mechanism 80 is located at that end of the arcuate slot 78 where the pin 104 is located, the pin 104 either engages with the side wall 90 of the end of the tube of the angle limit mechanism 80 when it is in the first position 100 or is able to travel further and engage directly the threaded rod when the angle engagement mechanism 80 is in the second position 102 due to the fact that the part 88 removed from the end of tube 82 faces the pin 104. The rotation of the angle limit mechanism 80 between the two positions either causes the end 90 of the tube 82 to face the pin 104 or the part 88 of the tube 80 removed to face pin 104 allowing the additional distance of travel as it can continue to rotate until the pin 104 hits the threaded rod.

Persons skilled in the art may recognize other additions or alternatives to the means disclosed herein. However, all these additions and/or alterations are considered to be equivalents of the present invention.

What is claimed is:

1. A saw comprising:

a base;

a table rotatably mounted on the base;

an extension arm rigidly connected to the periphery of the table, the extension arm extending radially away from an axis of rotation of the table;

a saw unit mounted on the table for cutting work pieces located on at least one of the table and extension arm;

a locking mechanism for angularly locking the position of the table relative to the base to prevent rotation of the table relative to the base, the locking mechanism comprising a locking member mounted on the extension arm, said locking member being linearly movable relative to the extension arm between a first position where a first engaging part of the locking mechanism is disengaged from the base to a second position where the first engaging part engages a first part of the base in order to prevent relative movement between the extension arm and the base, and said locking member being pivotable relative to the extension arm between a third position where a second engaging part of the locking mechanism is disengaged from the base to a fourth position where the second engaging part engages a second part of the base to prevent relative movement between the extension arm and the base, wherein the locking member comprises an elongated rod, and the first engaging part is a stop having an elongated recess for receiving an end of the elongated rod, a ball bearing being disposed within the recess and held between the elongated rod and the stop.

2. The saw of claim 1, wherein the elongated rod is mounted in an axially movable manner within a mount, the mount being pivotally connected to the extension arm.

3. The saw of claim 2, wherein the elongated rod is threaded along at least part of its length, the threaded portion engaging with a threaded aperture formed in the mount.

4. The saw of claim 1, wherein a knob is attached to the end of the elongated rod.

5. The saw of claim 1, wherein the elongated rod slides through the mount.

6. The saw of claim 1, wherein the first engaging part is mounted onto the elongated rod.

7. The saw of claim 1, wherein the first engaging part is mounted on an end of the elongated rod.

8. The saw of claim 1, wherein the stop is made of rubber.

9. The saw of claim 1, wherein a the ball bearing is located within the recess and is held sandwiched between the end of the elongated rod and the recess.

10. The saw of claim 2, wherein the second engaging part is mounted on the mount.

11. The saw of claim 1, wherein the second engaging part is a conical pin.

12. The saw of claim 1, wherein the second part of the base is a hole.

* * * * *